US011573714B2

(12) United States Patent
Chen

(10) Patent No.: US 11,573,714 B2
(45) Date of Patent: *Feb. 7, 2023

(54) COMPRESSIBILITY INSTRUMENTED DYNAMIC VOLUME PROVISIONING

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/215,350

(22) Filed: Mar. 29, 2021

(65) Prior Publication Data

US 2021/0216226 A1      Jul. 15, 2021

Related U.S. Application Data

(63) Continuation of application No. 15/784,903, filed on Oct. 16, 2017, now Pat. No. 10,963,171.

(51) Int. Cl.
*G06F 3/06*          (2006.01)
*H04L 67/1097*    (2022.01)

(52) U.S. Cl.
CPC .......... *G06F 3/0631* (2013.01); *G06F 3/061* (2013.01); *G06F 3/0604* (2013.01); *G06F 3/0605* (2013.01); *G06F 3/067* (2013.01); *G06F 3/0608* (2013.01); *G06F 3/0623* (2013.01); *G06F 3/0644* (2013.01); *G06F 3/0689* (2013.01); *H04L 67/1097* (2013.01)

(58) Field of Classification Search
None
See application file for complete search history.

(56) References Cited

U.S. PATENT DOCUMENTS 7,752,180 B1    4/2010   Fair et al.
8,156,306 B1    4/2012   Raizen et al.
(Continued)

FOREIGN PATENT DOCUMENTS

WO     2017/034642 A9    3/2017

OTHER PUBLICATIONS

Richard T. Arnold; "D8TADUDE—Making tech simple—3PAR, Storage, Virtualization and Cloud"; Feb. 21, 2017; https://d8tadude.com/2017/02/21/3par-dedupe-compression/; (16 pages).
(Continued)

*Primary Examiner* — Charles Rones
*Assistant Examiner* — Ryan Dare
(74) *Attorney, Agent, or Firm* — K&L Gates LLP

(57) ABSTRACT

Compressibility instrumented dynamic volume provisioning is disclosed. For example, a plurality of storage pools includes first and second storage pools, and is managed by a storage controller that receives a request to provision a first persistent storage volume associated with a first container, where the first storage pool has a first storage configuration including a deduplication setting, a compression setting, and/or an encryption setting. The first persistent storage volume is created in the first storage pool based on a first storage mode stored in metadata associated with the first container, where the storage mode includes a deduplication mode, a compression mode, and/or an encryption mode. A second persistent storage volume is in the second storage pool with a second storage configuration different from the first storage configuration based on a second storage mode associated with a second container.

20 Claims, 5 Drawing Sheets

(56) References Cited

U.S. PATENT DOCUMENTS

| | | |
|---|---|---|
| 8,650,159 B1 | 2/2014 | Zhang et al. |
| 8,793,372 B2 | 7/2014 | Ashok et al. |
| 8,898,120 B1 | 11/2014 | Efstathopoulos |
| 8,965,937 B2 | 2/2015 | Cashman et al. |
| 9,275,068 B2 | 3/2016 | Chambliss et al. |
| 2014/0032925 A1 | 1/2014 | Panchbudhe et al. |
| 2014/0036383 A1 | 2/2014 | Cideciyan et al. |
| 2014/0281361 A1 | 9/2014 | Park et al. |
| 2017/0277709 A1 | 9/2017 | Strauss et al. |
| 2018/0173554 A1 | 6/2018 | Caradonna et al. |
| 2018/0267990 A1 | 9/2018 | Cherukuri et al. |
| 2018/0314727 A1 | 11/2018 | Epsein et al. |

OTHER PUBLICATIONS

Jeannie Liou; "Why Deduplication Matters for Cloud Storage"; Feb. 8, 2017; (5 pages).

COMPRESSIBILITY INSTRUMENTED DYNAMIC VOLUME PROVISIONING

CROSS REFERENCES TO RELATED APPLICATIONS

The present application is a continuation of application Ser. No. 15/784,903, filed on Oct. 16, 2017, the entire content of which is hereby incorporated by reference herein.

BACKGROUND

The present disclosure generally relates to providing network storage in cloud environments. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware, enabling for additional flexibility and scalability of deployment. Multiple containers may also be clustered together to perform a more complex function than the respective containers are capable of performing individually. In an example, a container and/or a cluster of containers may be implemented specifically to execute certain specific tasks and/or types of tasks. Many computing tasks require the maintenance of persistent state information, and therefore many containers and virtual machines require network based storage. Accordingly, storage efficiency generally impacts the deployable compute density in a given environment.

SUMMARY

The present disclosure provides a new and innovative system, methods and apparatus for compressibility instrumented dynamic volume provisioning. In an example, a plurality of storage pools includes a first storage pool and a second storage pool, and is managed by a storage controller that receives a request to provision a first persistent storage volume associated with a first container, where the first storage pool has a first storage configuration including at least one of a deduplication setting, a compression setting, and an encryption setting. The first persistent storage volume is created in the first storage pool based on a first storage mode stored in metadata associated with the first container, where the storage mode includes at least one of a deduplication mode, a compression mode, and an encryption mode. A second persistent storage volume is in the second storage pool with a second storage configuration different from the first storage configuration based on a second storage mode associated with a second container.

Additional features and advantages of the disclosed method and apparatus are described in, and will be apparent from, the following Detailed Description and the Figures.

DETAILED DESCRIPTION OF EXAMPLE EMBODIMENTS

Figure 1:
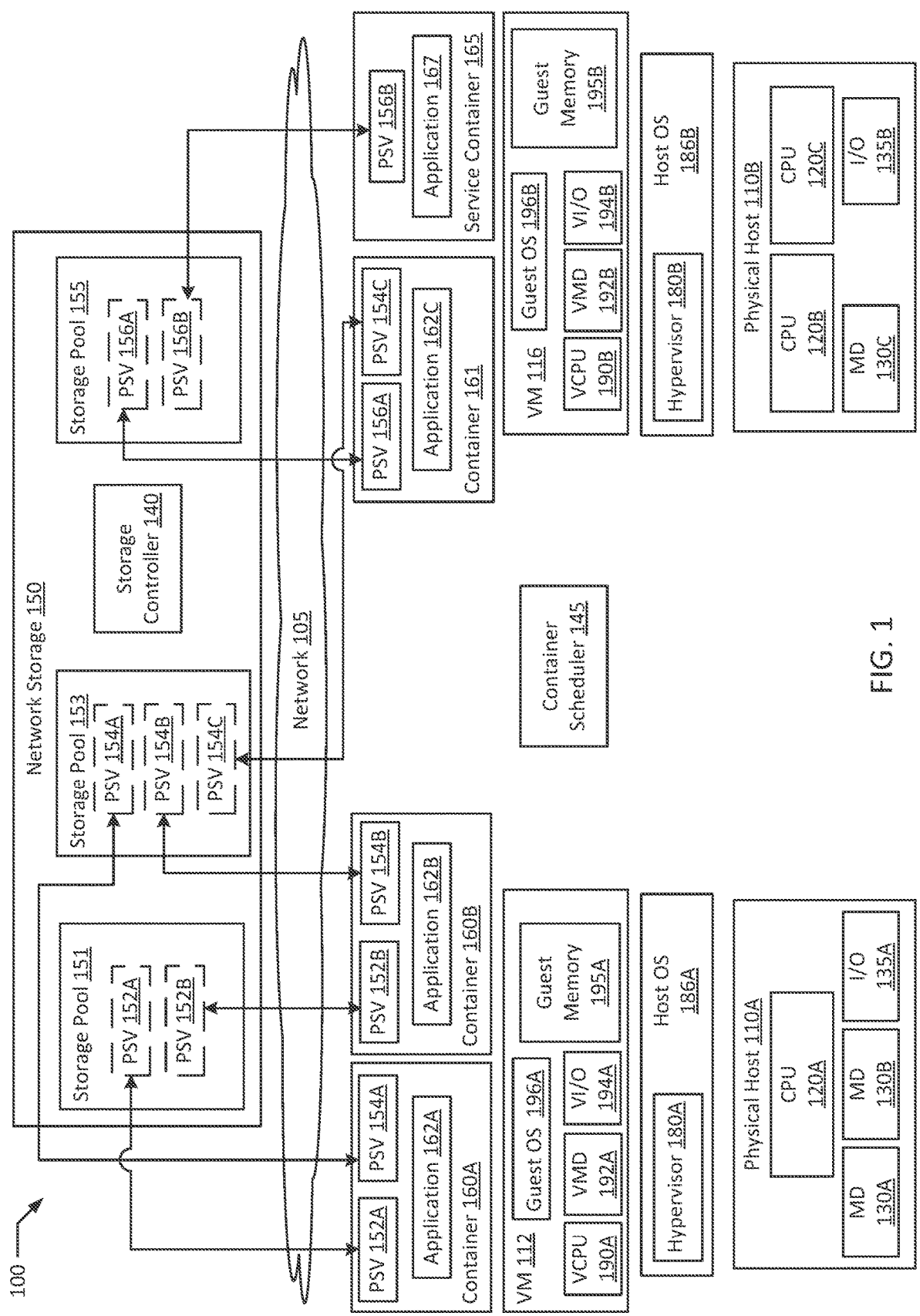
FIG. 1 is a block diagram of a compressibility instrumented dynamic volume provisioning system according to an example of the present disclosure.

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, a container based virtualization system such as Red Hat® OpenShift® or Docker® may be advantageous, as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Kubernetes®), generally respond to frequent container startups and cleanups with low latency. Containers may enable wide spread, parallel deployment of computing power for specific tasks. In a typical example, a container may be instantiated to process a specific task and reaped after the task is complete.

Due to economies of scale, containers tend to be more advantageous in large scale hardware deployments where the relatively fast ramp-up time of containers enables for more flexibility for many different types of applications to share computing time on the same physical hardware, for example, in a private or multi-tenant cloud environment. In some examples, where containers from a homogenous source are deployed, it may be advantageous to deploy containers directly on physical hosts. In some multi-tenant clouds, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. In an example, a physical and/or virtual host node may host hundreds of containers, each of which may independently execute tasks.

Many network applications, such as those hosted on containers in multi-tenant clouds, may require the saving of an execution state for a particular user accessing the application. For example, an online game may require the saving of game progress; an e-commerce site may require the saving of payment information and shopping carts; and a social media site may require the saving of interactions with a given post. Many applications may save data in the background for future interactions, for example, customizable interface settings and display preferences. Where settings and/or data require long term storage so that the data is available in future sessions of the application, storage that persists past the termination of a container executing the application may be required. Such applications may typically be referred to as stateful, in contrast to stateless applications where each interaction with the application is effectively independent of a subsequent interaction (e.g., web search, voice over internet protocol, video conferencing). In a typical example, such persistent storage may store data in devices such as hard drive disks ("HDD") and/or solid state drives ("SSD").

In a typical example, dedicated storage units may be connected to a network with hosts hosting containers executing stateful applications to store the execution states of these applications. In an example, the dedicated storage units may be in the form of Network Attached Storage ("NAS") and/or Storage Area Networks ("SAN"). Both NAS and SAN systems typically include replication of data to prevent against data loss due to a failure in any one device. Typically, using NAS or SAN systems for network storage may enable more efficient and more secure storage usage in a data center. For example, if each physical host and all of the applications executing on the physical host used only storage in the physical host, a large amount of wasted space may be needed to prevent against eventualities where heavy storage usage may occur. In an example, a physical host may use 30% of its storage capacity on average, but may spike to using 90% of its storage capacity during periods of high traffic or when there are execution errors. By configuring the same physical host to only use direct attached storage ("DAS") for core system functions, while moving application specific storage to NAS or SAN systems, the amount of storage on a given application host may be greatly reduced to a very predictable amount. In an example, a data center using typical DAS storage may be constructed with a 70% storage buffer on each physical host to locally absorb any spikes in usage. In the example, each host may typically use 300 GB of a 1 TB storage capacity. Due to the large amounts of storage typically available in a NAS or SAN system, spikes in storage usage by applications may be absorbed as needed, with much less overhead. For example, a 20 TB NAS storage may serve 40 hosts as storage at 300 GB used per host, and still have 8 TB remaining to absorb spikes in usage by individual applications. Therefore 20 TB NAS of storage may be sufficient to cover any realistic spikes in usage rather than 40 TB of DAS storage, or a 50% reduction in overhead. In addition, sharing files between applications on different servers may be streamlined using network storage. In a typical deployment, logical storage pools may be created in network storage systems. For example, a Logical Unit Number ("LUN") may be assigned to a logical volume residing on one or more physical storage devices that in aggregate provide the performance characteristics requested. In an example, a requested storage volume may require higher input/output rates than a single physical HDD can support, but if the volume is spread over two HDDs, each committing half the writes, peak throughput may be almost doubled. In an example, multiple layers of logical storage pools may be implemented to abstract the physical storage devices in a storage node. For example, a large storage pool may be allocated by a storage provider as "high performance" storage with high physical throughput and little overhead (e.g., no compression, limited deduplication, no encryption). Users requesting storage may then request the high performance storage type and have space allocated out of the high performance storage pool.

A typical storage unit (e.g., DAS, NAS, SAN, or other persistent storage) may be additionally implemented with efficiency, security, and/or performance optimizations. For example, storage capacity may be greatly enhanced through implementing compression and/or deduplication on a given storage device. Deduplication may be performed on many different levels, for example, on a block level, a file level, a file system level, or even a storage pool level. Similarly, compression may typically be available on a block and/or a file level. In an example, an email server may receive an email message with a 1 MB attachment for an entire 1,000 employee company. Without deduplication, the attachment would be stored 1,000 times resulting in 1 GB of storage used. However, since the attachment is identical, with file level deduplication, only one copy actually needs to be stored with virtual links to that copy made to each recipient, resulting in a nearly 99.9% reduction in space usage. A typical method of lossless or reversible data compression may entail encoding a file to represent repeated data with short form symbols. For example, "aaaaa" may be represented effectively as "5a" resulting in a 60% savings in space used. Similarly, repeated data may be given a symbol representation and therefore result in significant space savings. For example, a log file for user logins may repeatedly store lines similar to "[User1] successful login from [IP address]." In the example, "successful login from" may be compressed to a single character and therefore a single byte, therefore resulting in a 95% reduction in space from, for example, 21 bytes to 1 byte. In the email server example, if the 1 MB attachment is a text file, the addition of compression may further reduce the storage space taken by upwards of 90%, resulting in an overall 99.99% space savings. Compression and deduplication may be performed at different granularities, with corresponding performance penalties and efficiency advantages. Storage capacity optimizations may also include optimizations of metadata space and caching, for example, each file stored in a storage system requires a logical address to be accessed. A system storing many small files may therefore run out of addresses before it runs out of space, so increasing the size of the address pool (e.g., number of inodes, reducing block size) may allow more storage to be used. However, more addresses may require more seek time per access resulting in an overall performance penalty. Security optimizations may include features such as encryption and scrambling.

Compression and deduplication often come with significant performance penalties. In an example, compression or block level deduplication typically slows down file writes by 50-60%, even up to 90%. In addition, many file types may benefit very little from compression or very granular (e.g., block level) deduplication. For example, most commonly utilized storage formats for image and video data are already compressed, so additional compression may result in little to no space savings at the cost of significant latency.

In a typical example, efficiency settings may be configured broadly for large parts of a given storage system. In a multi-tenant cloud environment, the storage provider may have little insight regarding the types of files being stored by any given tenant. Therefore, the storage provider may attempt to strike a balance between performance and space efficiency without being optimized for either. For example, without knowing that a significant portion of the cloud's tenant's data is compressible, turning on storage compression may severely impact performance while saving little total storage space. In addition, in most typical systems, a given host (e.g., physical server, virtual machine, container, etc.) may store a large mix of file types in persistent storage, further compounding optimization efforts for storage providers. Compromise solutions typically leave significant room for improvement in terms of storage capacity efficiency and/or storage throughput performance. In a typical example, while a user or tenant may request performance throughput and size characteristics when requesting for storage, efficiency settings are typically managed by the storage provider without input from the users.

The present disclosure aims to address the performance and efficiency deficiencies of network storage solutions by employing compressibility instrumented dynamic volume provisioning. In an example, an isolated guest, deployed to a multi-tenant cloud may typically be engineered for a specific well defined task that benefits from rapid scalability. Therefore the isolated guest, especially in the case of containers, may be configured to execute a limited set of applications with a limited set of inputs and outputs. The applications and services being executed on a given container may then be correlated to whether storage requests from the container would benefit from compression and/or deduplication, in part due to a typically strong correlation between a given application and its output file type. In an example metadata relating to preferred deduplication, compression, encryption, metadata caching, preference/requirement for block vs. object storage, and other performance/efficiency modes of a given container may be associated with an image file from which the container is launched. A storage controller provisioning persistent storage volumes may then match these modes to corresponding deduplication, compression, encryption, metadata caching, and other performance/efficiency settings in storage pools managed by the storage controller in order to find a storage pool in which to create the persistent storage volume for the container, thereby improving storage efficiency and/or throughput performance for the container. In an example, a storage mode of the container including deduplication, compression, and/or encryption modes may be computed and/or refined based on historical outputs of other containers launched from the same image file. In an example, a storage controller may create a persistent storage volume in an existing storage pool whose storage configuration best matches the container's storage mode, or the storage container may launch a new storage pool with a storage configuration matching the requested storage mode. In various examples, finding a proper fit for a given container's persistent storage volumes may result in storage latency reductions of over 90% and/or storage density increase of over 90%.

FIG. 1 is a block diagram of a compressibility instrumented dynamic volume provisioning system according to an example of the present disclosure. The system 100 may include one or more physical hosts 110A-B. Each physical host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-C refers to a volatile or non-volatile memory device, such as RAM, ROM, EEPROM, or any other device capable of storing data. As discussed herein, I/O device 135A-B refer to devices capable of providing an interface between one or more processor pins and an external device, the operation of which is based on the processor inputting and/or outputting binary data. CPUs 120A-C may be interconnected using a variety of techniques, ranging from a point-to-point processor interconnect, to a system area network, such as an Ethernet-based network. Local connections within each physical host 110A-B, including the connections between a processor 120A and a memory device 130A-B and between a processor 120A and an I/O device 135A may be provided by one or more local buses of suitable architecture, for example, peripheral component interconnect (PCI).

In an example, physical hosts 110A-B may run one or more isolated guests, for example, VMs 112 and 116, containers 160A, 160B, 161, and 165. In an example, any of containers 160A, 160B, 161, and 165 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VMs 112 and 116 may be VMs executing on physical hosts 110A-B. In an example, containers 160A-B may execute on VM 112 while containers 161 and 165 may execute on VM 116. In an example, storage controller 140 and/or container scheduler 145 may execute either independently or within a container. In an example, any of containers 160A, 160B, 161, and 165 may be executing directly on either of hosts 110A-B without a virtualized layer in between. In an example, isolated guests may be further nested in other isolated guests. For example, VMs 112 and 116 may host containers (e.g., containers 160A, 160B, 161, and 165). In addition, containers and/or VMs may further host other guests necessary to execute their configured roles. For example, a VM (e.g., VM 112 or 116) and/or a container (e.g., containers 160A, 160B, 161, and 165) may further host a Java® Virtual Machine ("JVM") if execution of Java® code is necessary.

System 100 may run one or more VMs (e.g., VMs 112 and 116), by executing a software layer (e.g., hypervisor 180A-B) above the hardware and below the VMs 112 and 116, as schematically shown in FIG. 1. In an example, the hypervisors 180A-B may be components of respective host operating systems 186A-B executed by the system 100. In another example, the hypervisors 180A-B may be provided by an application running on respective operating systems 186A-B, or may run directly on respective physical hosts 110A-B without an operating system beneath them. Hypervisor 180A-B may virtualize the physical layer, including processors, memory, and I/O devices, and present this virtualization to VMs 112 and 116 as devices, including virtual central processing units ("VCPUs") 190A-B, virtual memory devices ("VMDs") 192A-B, virtual input/output ("VI/O") devices 194A-B, and/or guest memories 195A-B. In an example, a container may execute directly on host OSs 186A-B without an intervening layer of virtualization.

In an example, a VM 112 may be a virtual machine and may execute a guest operating system 196A which may utilize the underlying VCPU 190A, VMD 192A, and VI/O 194A. One or more isolated guests (e.g., storage container 150 and service container 160) may be running on VM 112 under the respective guest operating system 196A. Processor virtualization may be implemented by the hypervisor 180A scheduling time slots on one or more physical processors 120A such that from the guest operating system's perspective those time slots are scheduled on a virtual processor 190A.

VM 112 may run on any type of dependent, independent, compatible, and/or incompatible applications on the underlying hardware and host operating system 186A. In an example, containers 160A-B running on VM 112 may be dependent on the underlying hardware and/or host operating system 186A. In another example, containers 160A-B running on VM 112 may be independent of the underlying hardware and/or host operating system 186. In an example, containers 160A-B running on VM 112 may be compatible with the underlying hardware and/or host operating system 186A. Additionally, containers 160A-B running on VM 112 may be incompatible with the underlying hardware and/or OS. The hypervisor 180A may manage memory for the host operating system 186A as well as memory allocated to the VM 112 and guest operating system 196A such as guest memory 195A provided to guest OS 196. In an example, VM 116 and its associated components guest OS 196B, VCPU 190B, VMD 192B, VI/O 194B, and guest memory 195B may perform similar corresponding roles to the components in VM 112. Similarly, hypervisor 180B and host OS 186B may function in similar roles as related to VM 116 as hypervisor 180A and host OS 186A do to VM 112. In an example, s containers 161 and 165 may execute on VM 116 or directly on physical host 110B.

In an example, network 105 may be any form of suitable network for enabling communications between computing devices, for example, a public network (e.g., the Internet), a private network (e.g., a local area network (LAN) or wide area network (WAN)), or a combination thereof. In an example, network storage 150 may be any type of persistent storage (e.g., NAS, SAN, etc.) that may be divided into storage pools (e.g., storage pools 151, 153, and 155) with storage configurations including deduplication, compression, and/or encryption settings. In an example, network storage 150 and containers 160A-B, 161, and/or 165 may be separated by network 105. In the example, network storage 150 may host a persistent storage volumes 152A-B, 154A-C, and 156 A-B associated containers 160A-B, 161, and/or 165.

In the example, storage controller 140 may manage the deployment of storage pools (e.g., storage pools 151, 153, and 155) and the allocation of persistent storage volumes (e.g., persistent storage volumes 152A-B, 154A-C, and 156 A-B) in system 100. In an example, container scheduler 145 may be a component responsible for assigning compute tasks executed in containers to various host nodes (e.g., VMs 112 and 116, physical hosts 110A-B). In the example, container scheduler 145 is responsible for launching containers (e.g., containers 160A-B, 161, and 165) on the selected hosts. In an example, container scheduler 145 and/or storage controller 140 may be included in a container orchestrator (e.g., Kubernetes®). In an example, container scheduler 145 and/or storage controller 140 may be implemented via any form of executable code (e.g., executable file, script, application, service, daemon). In an example, applications 162A-C and 167 may be any form of executable code (e.g., executable file, script, application, service, daemon) that stores data to persistent storage volumes (e.g., persistent storage volumes 152A-B, 154A-C, and 156 A-B) on network storage 150.

Figure 2:
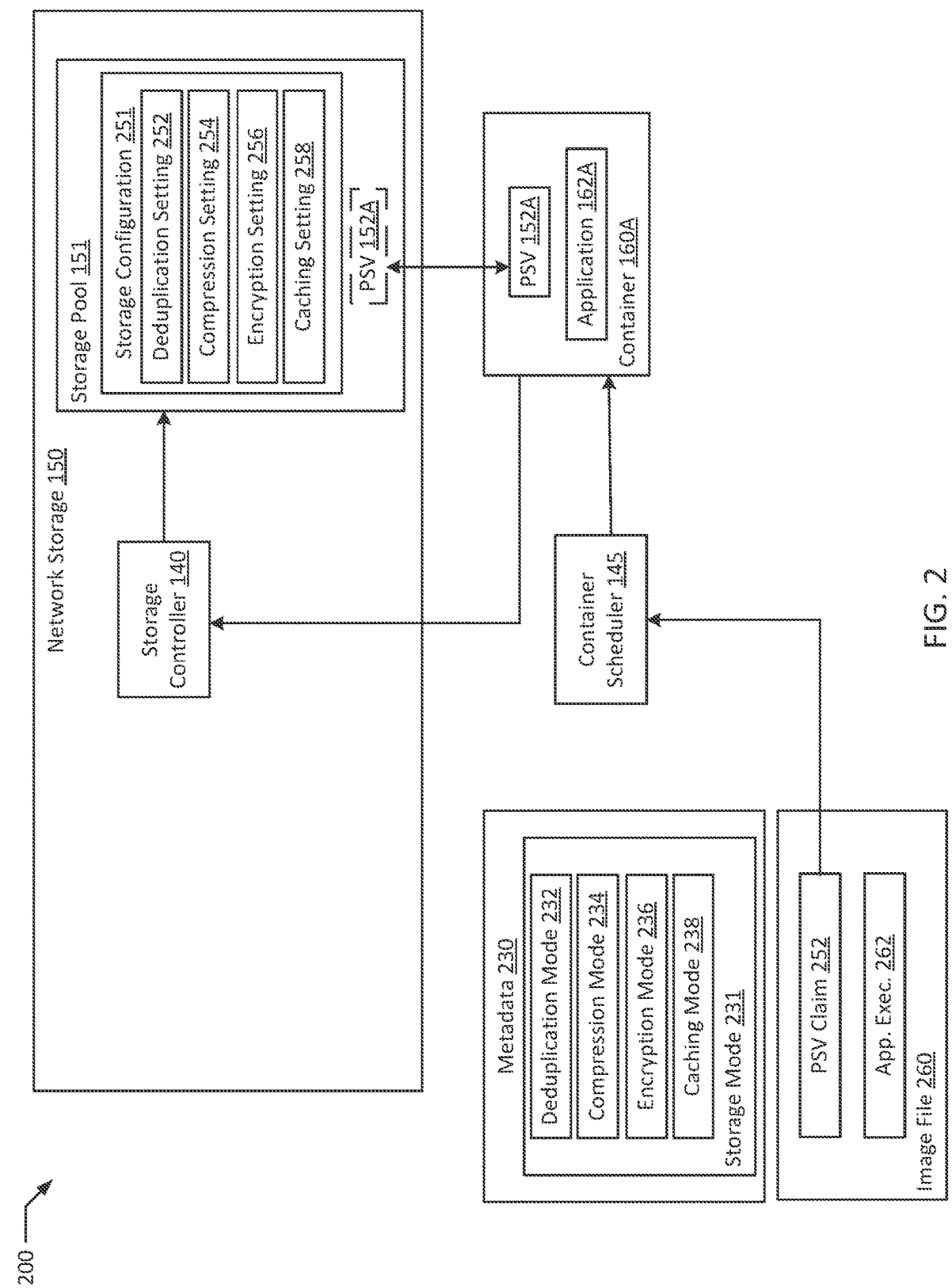
FIG. 2 is a block diagram illustrating persistent storage volume provisioning in a compressibility instrumented dynamic volume provisioning system according to an example of the present disclosure.

FIG. 2 is a block diagram illustrating persistent storage volume provisioning in a compressibility instrumented dynamic volume provisioning system according to an example of the present disclosure. In an example, container 160A is launched by container scheduler 145 with image file 260. In the example, application 162A executing on container 160A is launched from application executable 262 in image file 260. In the example, image file 260 includes persistent volume claim 252 which is a request for persistent storage for containers launched from image file 260 (e.g., container 160A). In an example, persistent volume 152A is generated based on persistent volume claim 252. In the example, persistent storage volume 152A provides storage for application 162A. In an example, metadata 230 associated with image file 260 includes storage mode metadata (e.g., storage mode 231) for persistent volume claim 252. In the example, metadata 230 includes deduplication mode 232, compression mode 234, encryption mode 236, and caching mode 238. In an example, metadata 230 may additionally include other configuration settings such as storage size, required read and/or write rates, block or object storage requirements or restrictions, mirroring and/or replication settings, and other non-storage related metadata. In an example, metadata 230 or deduplication mode 232, compression mode 234, encryption mode 236, and/or caching mode 238 stored in metadata 230 is included in persistent volume claim 252. In various examples persistent volume claim 252 may be sent to storage controller 140 by container scheduler 145, container 160A, or another component in the container instantiation workflow.

In an example, upon receiving persistent volume claim 252, storage controller 140 determines if any existing storage pool (e.g., storage pools 151, 153, and 155) has matching storage configuration settings (e.g., storage configuration 251), including deduplication setting 252, compression setting 254, encryption setting 256, and caching setting 258, with those contained in metadata 230 included with persistent volume claim 252. In an example, application 162A is a discussion forum. In the example, application 162A is configured to store and deliver text posts to the forum. Persistent volume claim 252 is configured to request a persistent storage volume 152A with block level deduplication (e.g., deduplication mode 232), compression turned on (e.g., compression mode 234), encryption turned off (e.g., encryption mode 234), and a flag for a storage pool with an elevated metadata cache for file descriptors (e.g., caching mode 234) due to the typically small size of each stored file. In the example, each of deduplication mode 232, compression mode 234, encryption mode 236, and caching mode 238 matches a corresponding deduplication setting 252, compression setting 254, encryption setting 256, and caching setting 258 of storage pool 151, and therefore storage pool 151 is selected to host persistent storage volume 152A.

Figure 3:
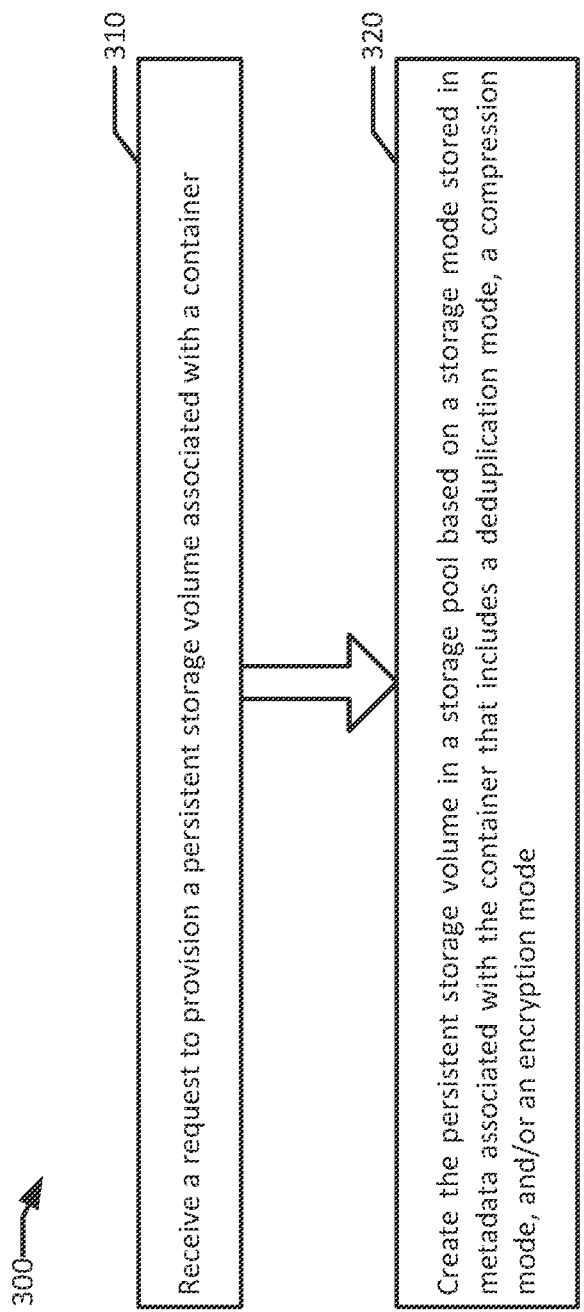
FIG. 3 is a flowchart illustrating an example of compressibility instrumented dynamic volume provisioning according to an example of the present disclosure.

FIG. 3 is a flowchart illustrating an example of compressibility instrumented dynamic volume provisioning according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a storage controller 140 with a container scheduler 145.

Example method 300 may begin with receiving a request to provision a persistent storage volume associated with a first container (block 310). In an example, a plurality of storage pools includes a first storage pool 151 and a second storage pool 155, and the first storage pool 151 has a first storage configuration 251 including a deduplication setting 252, a compression setting 254, and/or an encryption setting 256. In an example, container scheduler 145 launches container 160A from image file 260, resulting in persistent volume claim 252 being received by storage controller 140 to create persistent storage volume 152A. In an example, storage configuration 251 further includes caching setting 258. In an example, storage pool 151 is one of a plurality of storage pools including storage pools 153 and 155. In the example, storage pools 153 and/or 155 each have at least one different setting in their respective storage configurations as compared to storage pool 151.

The persistent storage volume is created in the storage pool based on a storage mode stored in metadata associated with the container, where the storage mode includes a deduplication mode, a compression mode, and/or an encryption mode (block 320). In an example, persistent volume claim 252 is the request to create persistent storage volume 152A, and specifies storage mode 231 including block level deduplication (e.g., deduplication mode 232), compression turned on (e.g., compression mode 234), encryption turned off (e.g., encryption mode 234), and a flag for a storage pool with an elevated metadata cache for file descriptors (e.g., caching mode 234) due to the small size of each stored file. In an example, deduplication mode 232, compression mode 234, encryption mode 236, and caching mode 238 matches a corresponding deduplication setting 252 (e.g., block level deduplication), compression setting 254 (e.g., compression on), encryption setting 256 (e.g., encryption off), and caching setting 258 (e.g., increased cache size) of storage pool 151, and therefore storage pool 151 is selected to host persistent storage volume 152A. In another example, storage pool 151 may be selected even if one or more of the settings (e.g., deduplication setting 252, compression setting 254, encryption setting 256, and caching setting 258) of storage pool 151 does not match the corresponding mode (e.g., deduplication mode 232, compression mode 234, encryption mode 236, and caching mode 238) of storage mode 231. In an example, storage mode 231 may only include deduplication mode 232 and leave the other settings up to storage controller 140 to decide. In another example, there may be insufficient capacity in any storage pools with matching settings to allocate 152A. In such examples, storage controller 140 may create a new storage pool with matching settings, but may select a suboptimal storage pool under certain circumstances, for example, when launching a new storage pool is not possible (e.g., due to capacity) or would be underutilized. For example, where there is insufficient capacity to allocate another storage pool, storage pool 151 may be selected even if suboptimal for persistent storage volume 152A. Alternatively, certain combinations of modes may have relatively little cumulative effect. For example, block level deduplication alone may achieve the majority of the space savings of block level deduplication and compression, and therefore storage controller 140 may create persistent storage volume 152A in storage pool 151 even if compression setting 254 indicates that compression is off In an example, storage controller 140 may be configured to favor performance (e.g., higher throughput and/or reduced latency) or reducing storage capacity when selecting suboptimal storage pools. For example, storage mode 231 (e.g., block level deduplication, compression on, encryption off, increased metadata cache) may be created in a storage pool set for file level deduplication with compression, no encryption and a regular metadata cache if storage controller 140 is configured to favor performance. Alternatively, if storage controller 140 is configured to favor efficiency, a storage pool with block level deduplication, compression on, and encryption on may be selected instead. In an example, storage mode 231 and/or metadata 230 may additionally include suboptimal preferences (e.g., second best options) for deduplication mode 232, compression mode 234, encryption mode 236, and caching mode 238. For example, while some modes may have binary options (e.g., on/off), many modes may have secondary options as well (e.g., encryption with a specific protocol).

In an example, deduplication mode 232 included in storage mode 231 is a file level deduplication mode, a block level deduplication mode, or a no deduplication mode; compression mode 234 included in storage mode 231 is a compression on mode or a compression off mode; and encryption mode 236 included in storage mode 231 is an encryption on mode or an encryption off mode. In an example, compression mode 234 also includes a compression type (e.g., a choice of preferred compression protocol), and encryption mode 236 also includes an encryption type (e.g., a choice of encryption protocol). In an example, storage configuration 251 includes caching setting 258 and storage mode 231 includes caching mode 238. In an example, storage mode 231 may include additional performance and/or efficiency modes and storage configuration 251 may include additional performance and/or efficiency settings. In an example, potential permutations of storage mode 231 (e.g., modal settings of deduplication mode 232, compression mode 234, encryption mode 236, and caching mode 238) may be limited to a list of predefined storage modes supported by storage controller 140. For example, each additional variable at least doubles the number of permutations of possible storage configurations for achieving a perfect match, so limitations may be required to efficiently manage a reasonable number of storage pools. In such examples, rather than individualized values for deduplication mode, compression mode, encryption mode, etc., a storage mode may be stored and requested based on a reference to one of the predefined storage modes (e.g., "high performance", "data backup", "video hosting", etc.). In an example, the deduplication mode 232, the compression mode 234, and/or the encryption mode 236 included in storage mode 231, is set based on an application 162A executed on container 160A. In the example, container scheduler and/or storage controller 140 may, for example, access historical storage trends for previous instances of application 162A to determine optimal compressibility settings for container 160A.

In an example, persistent storage volume 156B is in storage pool 155 with a storage configuration different from storage configuration 251 based on a storage mode associated with container 165. In an example, persistent storage volume 156B is created in storage pool 155 based on a request (e.g., a persistent volume claim) from container 165 before container 160A requested persistent storage volume 152A. In another example, persistent storage volume 156B is created in parallel with persistent storage volume 152A at substantially the same time (e.g., by different processors or hosts). In another example, persistent storage volume 156B is created after persistent storage volume 152A. In an example, container 165 executes application 167 with a different file usage and storage usage profile as compared to application 162A. In another example, applications 162A-C may be copies of the same application, for example, a web forum. In the example, applications 162A-B may be configured to serve and store text for the forum, while application 162C is configured to serve and store video blog entries, resulting in a significantly different file and storage usage profile. In some examples, container 161 may be launched from the same image file as containers 160A-B, potentially with different initial startup variables. In another example, container 161 may be launched from a different image file with a different storage mode from containers 160A-B. In an example, storage controller 140 may dynamically react to transfer persistent storage volume 156A upon detecting characteristics of intensive video I/O. In an example, storage mode 231 may include optional secondary deduplication and compression modes to be selected based on actual observed usage. In an example, storage pool 155 is created based on a request to provision persistent storage volume 156B.

In an example, containers 160A and 160B are launched from the same container image file 260. In the example, container scheduler 145 may be a container orchestrator (e.g., Kubernetes®) or a component part of a container orchestrator, and is responsible for instantiating containers 160A-B. In the example, container 160B, container scheduler 145, and/or a container orchestrator requests the provisioning of persistent storage volume 152B. In an example, persistent storage volume 152B may have the same storage mode 231 as persistent storage volume 152A, and is therefore created on the same storage pool 151 as persistent storage volume 152A. Alternatively, for example due to a lack of capacity in storage pool 151, persistent storage volume 152B may be created in storage pool 155 which shares at least one configuration setting (e.g., deduplication setting, compression setting, encryption setting, cache setting, etc.) with storage configuration 251. In an example, storage pool 155 may be a second storage pool sharing all of the same configuration settings as storage pool 151.

In an example, an orchestrator may be configured with a volume provisioning module to aggregate similar applications (e.g., applications 162A-B and applications 162C-167) and containers (e.g., containers 160A-B and containers 161 and 165) in shared storage pools (e.g., storage pools 151, 153, and 155) to optimize data compression and deduplication ratios, for example, based on historical data from previous instances of those applications (e.g., application 162A) and/or containers (e.g., container 160A). In an example, the orchestrator may inspect a given container image (e.g., image file 260) to determine and/or update the container image's storage mode (e.g., storage mode 231) when a new instance of that container (e.g., container 160B) is requested. Special annotations may be added by a user to further refine storage allocation, for example, in a storage mode in metadata associated with the container image (e.g., image file 260). In an example, an orchestrator may also request storage controller 140 to create a new storage pool based on, for example, usage trending data. In an example, a storage controller 140 may create a mapping table to help direct storage requests to storage pools is based on application type, for example, where storage mode data is limited or absent.

In an example, a container (e.g., any of containers 160A-B, 161, and/or 167) may request more than one persistent storage volume (e.g., persistent storage volumes 152A-B, 154A-C, 156A-B). In the example, any requested persistent storage volume 152A-B, 154A-C, 156A-B may favor different performance and/or efficiency characteristics. In an example, containers 160A-B and 161 all execute applications 162A-C which are instances of a web forum. In the example, containers 160A-B are launched from the same image file 260 running applications 162A-B both configured to serve and store text from the web forum. Application 162C is in an alternative configuration serving and storing videos from the web forum. In an example, persistent storage volumes 152A-B are in storage pool 151 due to requesting for block level deduplication, compression, no encryption, and increased metadata cache, optimizations for text intensive storage. In an example, storage pool 153 is configured for block level deduplication, compression, encryption with a normal metadata cache. In the example, persistent storage volumes 154A-C may be requested to store logs and login information for the webserver components of applications 162A-C, and encryption may therefore be required for potentially sensitive user information. In an example, logs being repetitive text files are greatly reduced in size from both file level compression and block level deduplication. In an example, storage pool 155 is configured for file level deduplication, no compression, no encryption, and regular metadata cache. In the example, storage pool 155 is configured primarily for video storage (e.g., large, uncompressible files). In the example, application 162C serves the web forum's videos and receives user uploads, while application 167 may be a database instance where the database software is already compressing the data, so double compression would largely result in wasting processor cycles and latency. In an example, a database instance may benefit greatly from deduplication and/or compression or barely at all depending on what is stored.

In an alternative example, storage pool 151 may be configured for file level deduplication, which may be an order of magnitude faster than block level deduplication due to only requiring a check of a hash or checksum rather than comparing data on a storage block level. In the example, the web forum may disapprove of the performance impact from block level deduplication on text retrieval that users expect to be fast. In an example, storage pool 153 may be configured with block level deduplication and may store backups of data from the persistent storage volumes 152A, 152B, and 156A on storage pools 151 and 155. In the example, lower throughput performance on backup data may be acceptable in exchange for the space savings provided by block level deduplication. In an example, storage controller 140 creates each of storage pool 151, 153, and 155 based on differences between requested characteristics received with storage modes from persistent volume claims. In an example, storage controller 140 may further pre-create additional storage pools with commonly requested storage configurations. In an example, big data applications may typically have highly compressible and deduplicable data benefiting from both block level deduplication and compression.

Figure 4:
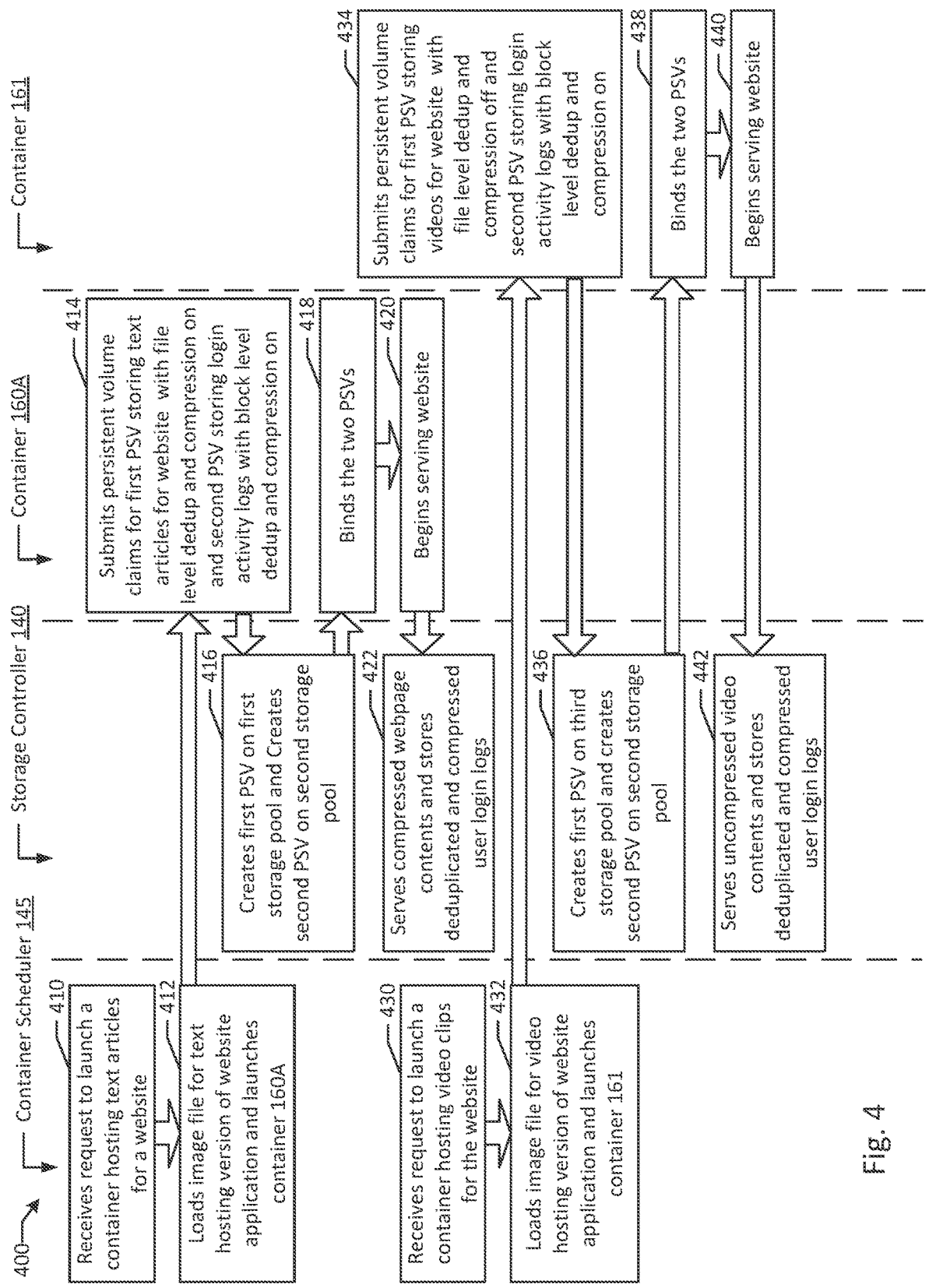
FIG. 4 is flow diagram of an example of compressibility instrumented dynamic volume provisioning according to an example of the present disclosure.

FIG. 4 is flow diagram of an example of compressibility instrumented dynamic volume provisioning according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, container scheduler 145 and storage controller 140 configure persistent storage volumes for containers 160A and 161.

In example system 400, container scheduler 145 receives a request to launch a container hosting text articles for a website (block 410). In the example, container scheduler 145 loads an image file for a text hosting version of the website application and launches container 160A (block 412). In the example, container 160A, after being launched, submits two persistent volume claims, one for storing text articles for the website with file level deduplication and compression on, and a second persistent storage volume storing login activity logs with block level deduplication and compression on (block 414). In an example, storage controller 140 receives these two persistent volume claims, and creates persistent storage volume 152A on storage pool 151 and persistent storage volume 154A on storage pool 153 (block 416). In an example, container 160A binds both persistent storage volumes 152A and 154A for use (block 418). Container 160A, and specifically application 162A begins serving the website after storage is provisioned (block 420). In the example, container 160A retrieves and serves the compressed webpage contents from persistent storage volume 152A and stores deduplicated and compressed user login logs on persistent storage volume 154A, for example, by sending requests through storage controller 140 (block 422).

In an example, container scheduler 145 receives a request to launch a container hosting video clips for the website (block 430). In the example, container scheduler 145 loads an image file for the video hosting version of the website application 162C and launches container 161 (block 432). In an example, container 161, upon being launched, submits persistent volume claims for a first persistent storage volume storing videos for the website with file level deduplication on and compression off, and for a second persistent volume storing login activity logs with block level deduplication and compression on (block 434). In an example, storage controller 140 creates persistent storage volume 156A on storage pool 155 and creates persistent storage volume 154C on storage pool 153 (block 436). In the example, container 161 binds persistent storage volumes 156A and 154C for use (block 438). In the example, container 161 begins serving the website after persistent storage provisioning (block 440). In the example, container 161 retrieves and serves the uncompressed video content from persistent storage volume 156A and stores deduplicated and compressed user login logs on persistent storage volume 154C, for example, by sending requests through storage controller 140 (block 442). In an example, even though persistent storage volume 156A is configured with the compression setting set to off, the video content may be encoded in a compressed format and may therefore be compressed even though persistent storage volume 156A did not perform the compression.

Figure 5:
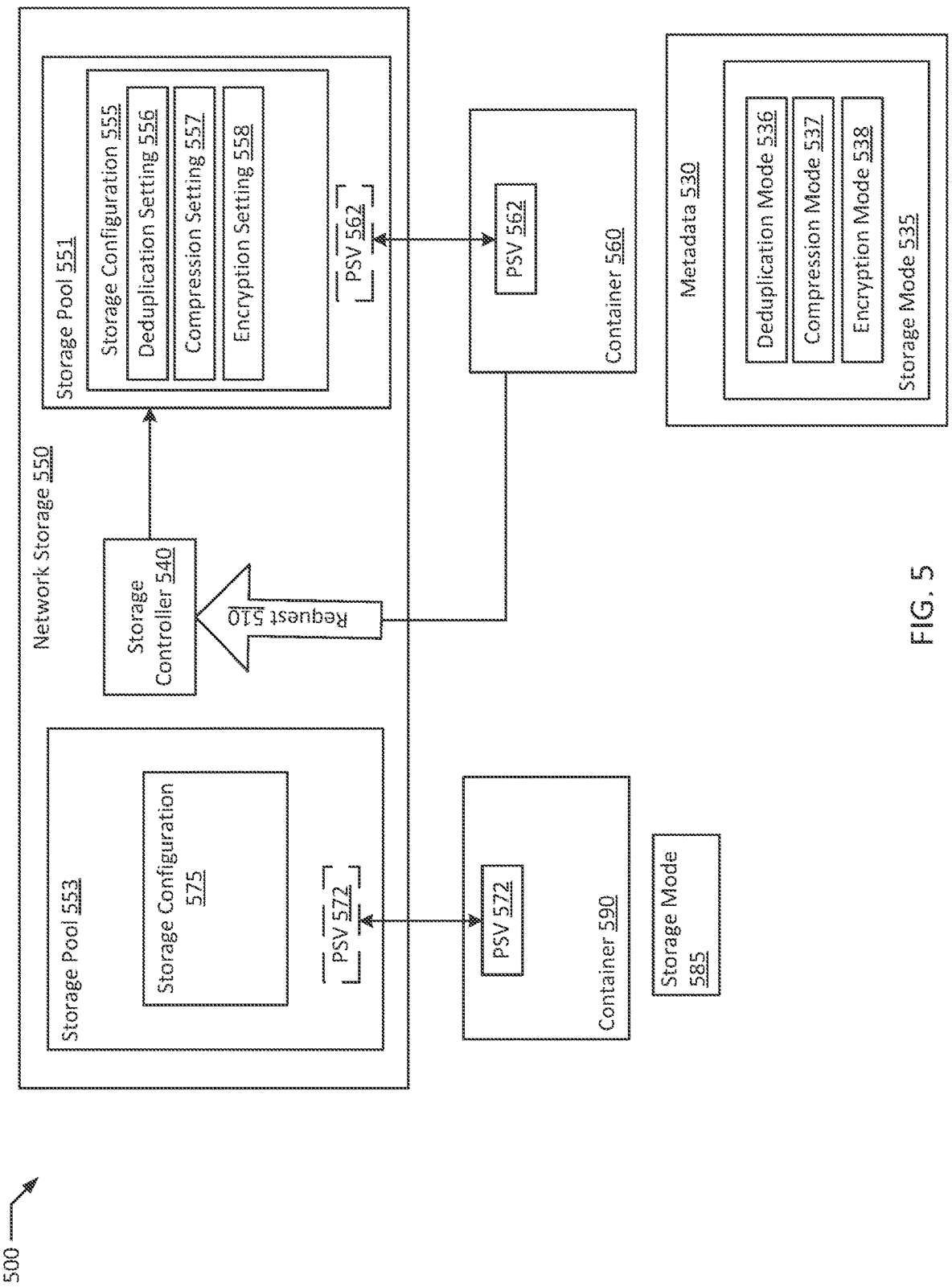
FIG. 5 is a block diagram of an example compressibility instrumented dynamic volume provisioning system according to an example of the present disclosure.

FIG. 5 is a block diagram of an example compressibility instrumented dynamic volume provisioning system according to an example of the present disclosure. Example system 500 includes storage pools 551 and 553 and storage controller 540 configured to manage storage pools 551 and 553 by executing to receive request 510 to provision a persistent storage volume 562 associated with container 560, where storage pool 551 has a storage configuration 555 including deduplication setting 556, compression setting 557, and/or encryption setting 558. Persistent storage volume 562 is created in storage pool 551 based on storage mode 535 stored in metadata 530 associated with container 560, where storage mode 535 includes deduplication mode 536, compression mode 537, and/or encryption mode 538. Persistent storage volume 572 is in storage pool 553 with storage configuration 575 different from storage configuration 555 based on storage mode 585 associated with container 590.

Through the deployment of compressibility instrumented dynamic volume provisioning, storage providers may deliver storage services more closely tailored to their users' needs. At the same time, users may better assess their actual storage needs to minimize wasteful overprovisioning, thereby improving hardware utilization and efficiency. Leveraging existing techniques for requesting persistent storage volumes, compressibility instrumented dynamic volume provisioning delivers write speed improvements of up to 90% (e.g., where block level deduplication and compression were turned on for storing videos), as well as increasing effective storage capacity by incredible factors (e.g., thousands of times from file level deduplication alone on an email server where deduplication was not enabled). With additional learning logic built into container orchestrators and/or storage controllers, repeatedly deployed isolated guests such as special task containers may be efficiently optimized for storage usage without direct human intervention.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a plurality of storage pools including first and second storage pools, wherein the first storage pool has a first storage configuration and the second storage pool has a different second storage configuration, each storage configuration respectively including at least one of a deduplication setting, a compression setting, an encryption setting, or a metadata caching setting, with one or more different settings between the first and second storage configurations; and a storage controller configured to manage the plurality of storage pools by executing to:

receive requests to provision a first persistent storage volume (PSV) associated with a first container and a different second PSV associated with the first container;

bind the first PSV in the first storage pool based on a first predefined storage mode stored in first metadata associated with the first container, the first predefined storage mode including a first deduplication mode, a first compression mode, a first encryption mode, and a first metadata caching mode; and bind a second PSV in the second storage pool based on a second predefined storage mode stored in second metadata associated with the first container, the second storage mode including a second deduplication mode, a second compression mode, a second encryption mode, and a second metadata caching mode such that the second storage configuration is different from the first storage configuration based on the second predefined storage mode associated with the first container.

2. The system of claim 1, wherein the first container and a third container are launched from a same container image by a container orchestrator, and a third PSV of the third container is requested by the container orchestrator.

3. The system of claim 2, wherein the first storage configuration includes a first deduplication setting, a first compression setting, and a first encryption setting, the second storage configuration includes a second deduplication setting, a second compression setting, and a second encryption setting, and the third PSV is created in one of the first storage pool or a third storage pool with a third storage configuration sharing at least one of a third deduplication setting, a third compression setting, or a third encryption setting with the first storage configuration.

4. The system of claim 3, wherein each of the at least one of the first deduplication setting, the first compression setting, or the first encryption setting included in the first storage configuration is the same as the third deduplication setting, the third compression setting, or the third encryption setting included in the third storage configuration.

5. The system of claim 1, wherein the first deduplication mode included in the first predefined storage mode is one of a file level deduplication mode or a block level deduplication mode, and the first compression mode included in the first predefined storage mode is one of a compression on mode or a compression off mode, and the first encryption mode included in the first predefined storage mode is one of an encryption on mode or an encryption off mode.

6. The system of claim 5, wherein the first compression mode also includes a compression type and the first encryption mode also includes an encryption type.

7. The system of claim 1, wherein a third PSV is requested to store backup data from the first PSV, and the third PSV is created in a third storage pool based on differences between a third predefined storage mode and the first predefined storage mode.

8. The system of claim 1, wherein at least one of the first deduplication mode, the first compression mode, or the first encryption mode included in the first predefined storage mode, is set based on an application executed on the first container.

9. The system of claim 8, wherein the application is also executed on a second container with a different application configuration from the application executing on the first container.

10. The system of claim 1, wherein the first predefined storage mode is one of a plurality of predefined storage modes.

11. The system of claim 1, wherein the first storage pool resides on a plurality of storage devices.

12. The system of claim 1, wherein at least one of the first predefined storage mode or the second predefined storage mode includes a block storage mode.

13. The system of claim 1, wherein at least one of the first predefined storage mode or the second predefined storage mode includes an object storage mode.

14. The system of claim 1, wherein at least one of the first predefined storage mode or the second predefined storage mode includes at least one of a read rate or a write rate.

15. A method comprising:

receiving requests to provision a first persistent storage volume (PSV) associated with a first container and a different second PSV associated with the first container, wherein a plurality of storage pools includes first and second storage pools, the first storage pool has a first storage configuration and the second storage pool has a different second storage configuration, each storage configuration respectively including at least one of a deduplication setting, a compression setting, an encryption setting, or a metadata caching setting, with one or more different settings between the first and second storage configurations;

binding the first PSV in the first storage pool based on a first predefined storage mode stored in first metadata associated with the first container, the first predefined storage mode including a first deduplication mode, a first compression mode, a first encryption mode, and a first metadata caching mode; and binding a second PSV in the second storage pool based on a second predefined storage mode stored in second metadata associated with the first container, the second storage mode including a second deduplication mode, a second compression mode, a second encryption mode, and a second metadata caching mode such that the second storage configuration is different from the first storage configuration based on the second predefined storage mode associated with the first container.

16. The method of claim 15, wherein a third PSV of a third container launched from a same container image as the first container is created in one of the first storage pool or a third storage pool with a third storage configuration sharing at least one of a third deduplication setting, a third compression setting, or a third encryption setting with the first storage configuration.

17. The method of claim 15, wherein the first deduplication mode included in the first predefined storage mode is one of a file level deduplication mode, a block level deduplication mode, or a no deduplication mode, the first compression mode included in the first predefined storage mode is one of a compression on mode or a compression off mode, and the first encryption mode included in the first predefined storage mode is one of an encryption on mode or an encryption off mode.

18. The method of claim 15, wherein at least one of the first deduplication mode, the first compression mode, or the first encryption mode included in the first predefined storage mode, is set based on an application executed on the first container.

19. The method of claim 18, wherein the application is also executed on a second container with a different application configuration from the application executing on the first container.

20. A computer-readable non-transitory storage medium storing executable instructions, which when executed by a computer system, cause the computer system to:

receive requests to provision a first persistent storage volume (PSV) associated with a first container and a different second PSV associated with the first container, wherein a plurality of storage pools includes first and second storage pools, the first storage pool has a first storage configuration and the second storage pool has a different second storage configuration, each storage configuration respectively including at least one of a deduplication setting, a compression setting, an encryption setting, or a metadata caching setting, with one or more different settings between the first and second storage configurations; and bind the first PSV in the first storage pool based on a first predefined storage mode stored in metadata associated with the first container, the first predefined storage mode including a first deduplication mode, a first compression mode, a first encryption mode, and a first metadata caching mode; and bind a second PSV in the second storage pool based on a second predefined storage mode stored in second metadata associated with the first container, the second storage mode including a second deduplication mode, a second compression mode, a second encryption mode, and a second metadata caching mode such that the second storage configuration is different from the first storage configuration based on the second predefined storage mode associated with the first container.

* * * * *